United States Patent [19]

Funk et al.

[11] Patent Number: 5,185,785
[45] Date of Patent: Feb. 9, 1993

[54] METHOD AND APPARATUS FOR RECORDING AND RATING TELECOMMUNICATION TRANSACTIONS MADE OVER A COMMUNICATION NETWORK

[75] Inventors: Michael W. Funk, Mountainside; Sue A. Lawson, Eatontown; David F. McGuigan, Franklin Township, Somerset County, all of N.J.

[73] Assignee: AT&T Bell Laboratories, Murray Hill, N.J.

[21] Appl. No.: 785,855

[22] Filed: Oct. 31, 1991

[51] Int. Cl.$^5$ ............... H04M 7/00; H04M 15/00
[52] U.S. Cl. .................. 379/111; 379/115; 379/120; 379/246; 379/229
[58] Field of Search ............ 379/121, 115, 119, 120, 379/126, 127, 111, 112, 222, 220, 224, 229

[56] References Cited

U.S. PATENT DOCUMENTS 4,162,377  7/1979  Mearns ........................ 379/127
4,942,599  7/1990  Gordon et al. ............... 379/246

Primary Examiner—Stafford D. Schreyer
Attorney, Agent, or Firm—John A. Caccuro

[57] ABSTRACT

A transaction recording and rating method and apparatus rates communication transactions completed using one or more Carrier Switched Network Point Of Attachment (CSN POA) locations of a communication network. The network stores a unique code for each CSN POA location. The rating systems store rating parameters associated with each CSN POA code. During a transaction (e.g., a call), one or more CSN POA locations are identified and their CSN POA codes are recorded. A transaction charge is calculated from the prestored rating parameter(s) obtained using the one or more CSN POA codes in addition to other information.

32 Claims, 4 Drawing Sheets

RATING TABLES

PRIOR ART TABLES

| TABLE A TERMINATING POINT MASTER FILE | NPA-NXX | STATE | LATA | V & H COORD. | NPA | TIME ZONE | ETC. |
|---|---|---|---|---|---|---|---|
| | | | | | | | |

| TABLE B NODAL BILLING INFORMATION | 10-DIGIT NO. (ONE ENTRY FOR EACH DIRECT-CONNECT CUSTOMER) | V & H COORD. | NPA | TIME ZONE | DSI | TAX JURISDICTION |
|---|---|---|---|---|---|---|
| | | | | | | |

TABLES USING CSN POA CODES

| TABLE A TERMINATING POINT MASTER FILE | NPA-NXX | STATE | LATA | V & H COORD. | NPA | TIME ZONE | ETC. |
|---|---|---|---|---|---|---|---|
| | | | | | | | |

NOTE THAT TABLE "A" DOES NOT CHANGE

| TABLE C CSN POA CODE TABLE | CSN POA CODE (ONE CSN POA CODE FOR ALL CUST. AT THAT CSN POA LOCATION)* | V & H COORD. | NPA | TIME ZONE | DSI | TAX JURISDICTION |
|---|---|---|---|---|---|---|
| | | | | | | |

*FOR EXAMPLE, IF 100 DIRECT-CONNECT CUSTOMERS ACCESS THE CSN VIA THE SAME CSN POA, A SINGLE ENTRY IS REQUIRED IN TABLE C VERSUS 100 ENTIRES IN TABLE B

FIG. 2
RATING TABLES

PRIOR ART TABLES

| TABLE A<br>TERMINATING<br>POINT MASTER<br>FILE | NPA-NXX | STATE | LATA | V & H COORD. | NPA | TIME ZONE | ETC. |
|---|---|---|---|---|---|---|---|
| | | | | | | | |

| TABLE B<br>NODAL BILLING<br>INFORMATION | 10-DIGIT NO.<br>(ONE ENTRY FOR EACH DIRECT-CONNECT CUSTOMER) | V & H COORD. | NPA | TIME ZONE | DSI | TAX JURISDICTION |
|---|---|---|---|---|---|---|
| | | | | | | |

TABLES USING CSN POA CODES

| TABLE A<br>TERMINATING<br>POINT MASTER<br>FILE | NPA-NXX | STATE | LATA | V & H COORD. | NPA | TIME ZONE | ETC. |
|---|---|---|---|---|---|---|---|
| | | | | | | | |

NOTE THAT TABLE "A" DOES NOT CHANGE

| TABLE C<br>CSN POA<br>CODE TABLE | CSN POA CODE<br>(ONE CSN POA CODE FOR ALL CUST. AT THAT CSN POA LOCATION)* | V & H COORD. | NPA | TIME ZONE | DSI | TAX JURISDICTION |
|---|---|---|---|---|---|---|
| | | | | | | |

*FOR EXAMPLE, IF 100 DIRECT-CONNECT CUSTOMERS ACCESS THE CSN VIA THE SAME CSN POA, A SINGLE ENTRY IS REQUIRED IN TABLE C VERSUS 100 ENTIRES IN TABLE B

FIG. 3

TABLE 300

| RECORDING NUMBERS AND CODES | NUMBERING PLANS |
|---|---|
| 310 — ORIGINATING NETWORK ADDRESS | NANP (EXCL. SACs), INT'L E.164, INTERNAL PLAN |
| 320 — ORIGINATING CSN POA CODE | CSN POA NUMBERING PLAN |
| 330 — TERMINATING CSN POA CODE | CSN POA NUMBERING PLAN |
| 340 — DESTINATION NETWORK ADDRESS | NANP (EXCL. SACs), INT'L E.164, INTERNAL PLAN |
| 350 — DIALED NUMBER | NANP, INT'L E.164, PRIVATE |
| 360 — BILLED PARTY NUMBER | NANP, INT'L E.164, CALLING CARD, ANSI CREDIT CARD |
| 370 — STATION IDENTIFICATION | CUSTOMER-DEFINED |

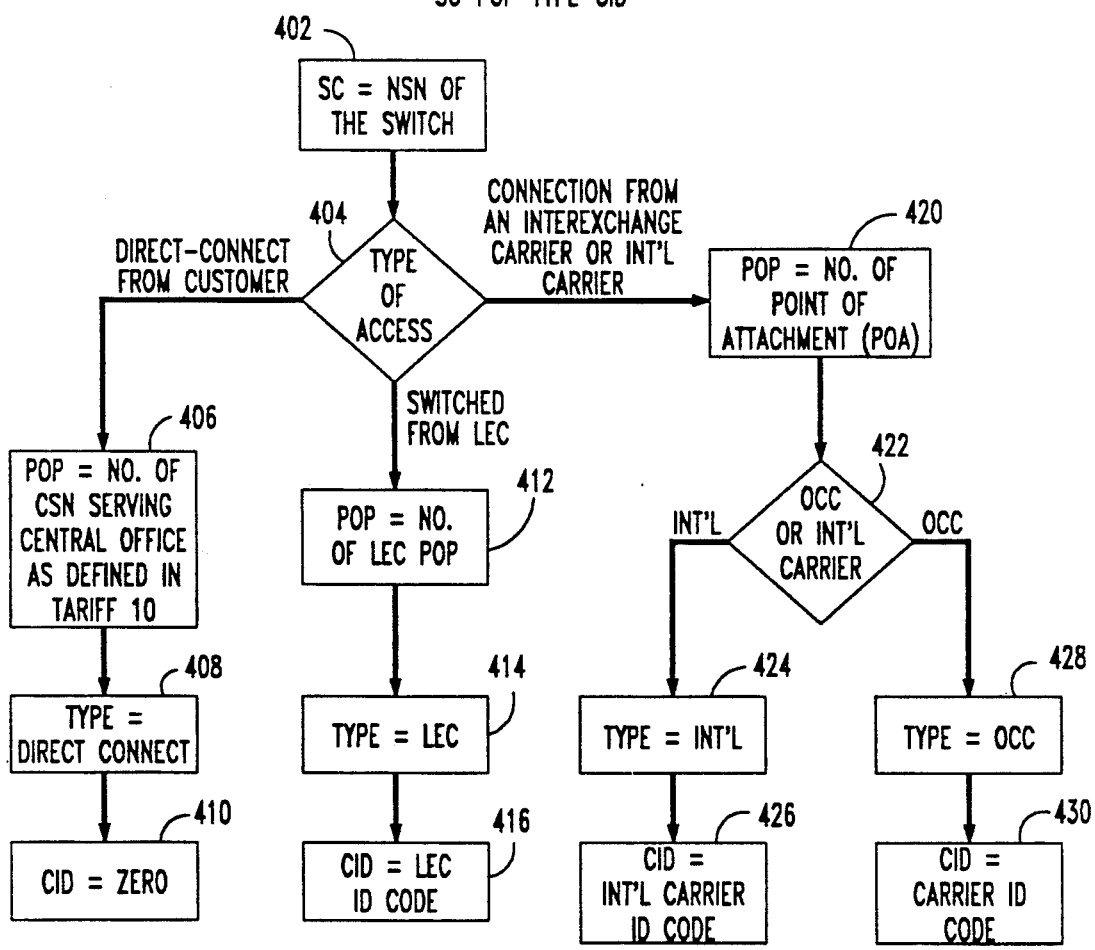

FIG. 4
ASSIGN CSN POA CODE
SC-POP-TYPE-CID

RECORDING PLAN

METHOD AND APPARATUS FOR RECORDING AND RATING TELECOMMUNICATION TRANSACTIONS MADE OVER A COMMUNICATION NETWORK

TECHNICAL FIELD

This invention relates to communication networks and, more particularly, to a method of and apparatus for recording and rating telecommunication transactions made over a communication network.

BACKGROUND OF THE INVENTION

The rating (i.e., calculation of charges) of voice and data calls is done by an automatic message accounting (AMA) system or other type of rating system which calculates charges based on the originating and terminating customers' location, the type of call service (e.g. 800, software defined network (SDN)) and the time and length of the call. An AMA record is generated for each call for which a telephone company will bill a customer. Prior to divestiture (the disassembly of the Bell System into American Telephone and Telegraph Company-AT&T and seven Regional Holding Companies-RHC) calls were rated based on the location of the calling and called parties. Since, divestiture, AT&T and other Carrier Switched Networks (CSNs) have begun offering nodal services to customers. As a result, the CSN rating systems also need information about the Point of Attachment (POA) to the CSN from the LEC or other customers. Generally, the rating systems cannot easily extract this POA information from the numbers recorded today. The rating systems typically maintain a large, cumbersome data table that provides for each number used for a nodal service: the state, LATA (Local Access and Transport Area, area served by a local exchange carrier) and NPA (Numbering Plan Area) of the customer premise; the Vertical and Horizontal (V&H) geographic coordinates, NPA, time zone, daylight savings indicator, tax jurisdiction of the serving central office, and possibly other information. Today, the POA information is obtained using the above-identified data tables that must be updated for every new and changed nodal customer. The increasing number and variety of new calling services and new tariffs require accurate rating and allocation of calling revenues, which is becoming more complicated and burdensome to provide using existing rating techniques.

What is desired is a simplified, more cost-effective recording and rating method to enable carrier networks to accurately bill customers for these nodal services, as well as accommodating non-nodal services and future service applications.

SUMMARY OF THE INVENTION

In accordance with the present invention, a unique code or number is assigned to each Carrier Switched Network Point of Attachment (CSN POA) location where one or more facilities connect to the CSN. All facilities (e.g., trunks) which connect to the CSN via this POA location are assigned the same CSN POA code. Transaction (e.g., call) rating parameters are then associated with each CSN POA code and provided to a rating system. When a transaction is completed over the CSN, the code of at least one CSN POA location of the transaction connection (e.g., either or both of the originating and terminating CSN POA codes) is recorded and used to calculate the charges for that transaction.

BRIEF DESCRIPTION OF THE DRAWING

In the drawing,

FIG. 2 shows the rating tables in use today as well as those utilized by the present invention;

FIG. 3 shows the various recording numbers and numbering plans used by the present invention;

FIG. 4 shows a flow diagram describing the assignment of CSN POA codes; and

NETWORK DESCRIPTION

Figure 1:
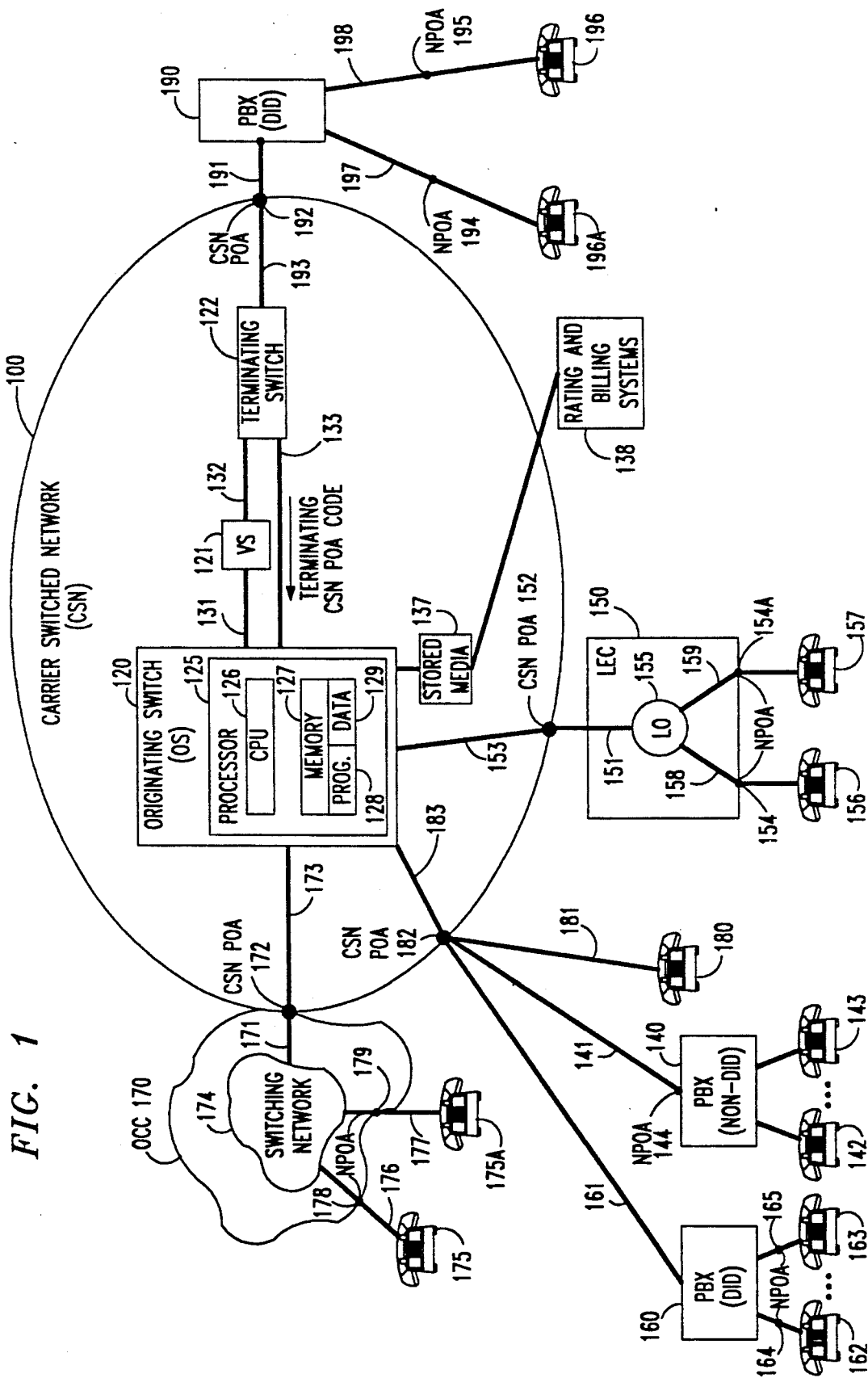
FIG. 1 shows, in block diagram form, an illustrative network useful in describing the operation of the present invention.

Shown in FIG. 1 is an illustrative Carrier Switched Network (CSN) 100 including a plurality of toll switching offices 120-122 interconnected by trunks 131-133. The illustrative network shown in FIG. 1 provides one application in which the present invention may be utilized. The CSN 100 may be, illustratively, the American Telephone and Telegraph Company (AT&T) switched network. The toll switching offices 120-122 may be, by way of example, 4 ESS TM digital switches available from AT&T. (ESS is a trademark of AT&T). This well-known digital switch is described in detail in *The Bell System Technical Journal*, Vol. 56, No. 7, September 1977, and Vol. 60, No. 6, part 2, July-August, 1981, which descriptions are incorporated by reference herein. Each of the switching offices 120-122 are controlled by a processor, e.g., 125, comprising CPU, e.g., 126, and memory, e.g., 127. A program memory 128 stores a system of programs to establish and control incoming and outgoing calls using data stored in data memory 129. The program memory 128 includes the program steps outlined in the flow charts in FIG. 5 and the data memory 129 includes trunk subgroup information, including the CSN POA code.

Switching office 120 is an Originating Switch (OS), switching office 121 is a Via Switch (VS), and switching office 122 is a Terminating Switch (TS) for the example calls. Originating Switch 120, as well as other switches of CSN 100, record pertinent transaction detail information, typically in AMA format, in stored media 137. The AMA records are sent in a well-known manner to rating and billing systems 138. Switching offices 120-122 selectively interconnect individual trunks 131-133 in response to routing information, such as the dialed telephone number of the called customer line received from a Local Exchange Carrier (LEC) 150 network, Other Common Carrier (OCC) 170 or telephone customers 140, 162, 163, 180.

The LEC 150 is shown, illustratively, to include a local switching office (LO) 155 which serves a plurality of customers at station sets 156 and 157 over loop facilities 158 and 159, respectively. On each of the facilities, a Network Point of Access (NPOA) 154 and 154A is designated indicating the point where the customer interfaces to the LEC 150. The LEC 150 connects to OS 120 via trunks 151 and 153. The interface of trunk 151 of LEC 150 to trunk 153 of CSN 100 is designated as a CSN POA 152.

The OCC 170 includes a switched network 174 which serves, illustratively, a plurality of customers 175 and 175A over trunks or loops 176 and 177, respectively. The interfaces between the customers 175 and 175A and OCC 170 are designated as NPOA 178 and 179, respectively. The OCC 170 connects to CSN 100 via trunks 171 and 173. The interface between trunk 171 of OCC 170 and trunk 173 of CSN 100 is designated as CSN POA 172.

The customer 180 connects to OS 120 via trunks 181 and 183. The interface between trunk 181 and trunk 183 is designated CSN POA 182. The CSN POA 182 also connects PBX 140 and PBX 160 to CSN 100 via trunks 141 and 161 respectively. The PBX 140 (non-Direct Inward Dialing, DID) provides service to station sets 142-143, while PBX 160 (with DID) provides service to station sets 162-163.

Another PBX 190 is shown, illustratively, to serve, with a direct-inward-dial (DID) capability, a plurality of customers 196A and 196 over lines 197 and 198, respectively. The PBX 190 connects to CSN 100 via trunks 191 and 193. The interface between the PBX customer's trunk 191 and trunk 193 of CSN 100 is designated as CSN POA 192.

It should be noted that the CSN POA is the location or point at which a customer's facility or another network's facility attaches to the CSN 100. For LEC 150 interconnections, the CSN POA 152 is the point of presence with the LEC 150. For CSN 100 Direct-Connect customer 180, the CSN POA 182 is the serving central office, which may be co-located with OS 120. For CSN 100 Direct-Connect customer 190, the CSN POA 192 is the serving central office, which may be co-located with TS 122. In FIG. 1, the CSN POAs are represented by the large dots on the boundary of CSN 100 which are uniquely associated with a CSN POA code.

Note, the NPOA is the furthest point from the CSN 100 (into another network or behind an AT&T Direct-Connect customer's equipment) that CSN 100 can address/identify during call set-up.

In FIG. 1, the direct-connect PBX 190 has Direct Inward Dialing (DID) capabilities so the CSN 100 can address all the stations (196A, 196) behind PBX 190. Therefore, the NPOAs 194, 195 for that location will be at the points where station equipment connects to the PBX 190. If the PBX 190 did not have DID capabilities, then CSN 100 could only address the PBX 190 (and not the stations behind the PBX 190). Thus, the NPOA for all stations behind PBX 190 would be the same. Private Networks that use only a private numbering plan are treated the same as non-DID PBXs.

The stations 156, 157 shown connected through the LO 155 have LEC 150-assigned public numbers (which CSN 100 can use to address/identify the stations) and, therefore, the NPOAs 154, 154A are at the points where the station equipment connects to LO 155.

The Network Address (NA) is the number that uniquely identifies an NPOA. Valid Network Addresses within the CSN will be the well-known numbers from the North American Numbering Plan (NANP), the CCITT-defined E.164 Numbering Plan and an internal numbering plan.

The OS 120 is the first CSN 100 switch used for routing a call through CSN 100 in our examples. Similarly, the TS 122 is the final CSN 100 Switch (egress switch) used for routing a call. The VS is any CSN 100 switch used for routing a call from the OS 120 to the TS 122.

Each CSN 100 switch is numbered using a unique CSN 100 Switch Code designated Network Switch Number (NSN). Such an NSN is described in our pending application Ser. No. 07/536378 filed on Jun. 11, 1990, and entitled "A Method of and Apparatus for Numbering and Routing Calls Through a Communication Network", abandoned, which is incorporated by reference herein.

DETAILED DESCRIPTION

Recording numbers are numbers recorded for use in rating calls and rendering bills. Recording numbers identify the origination, the destination, and the party to be billed for a call. Note, while the present invention is illustratively described for recording and rating telecommunication calls, it more generally can record and rate any transaction that can be handled by a communication network.

In the prior art, an Automatic Message Accounting (AMA) record is generated for each call for which CSN 100 will do the recording. AMA records containing aggregate call counts may also be generated, for example, a count of the number of times a feature was used in an hour. AMA records contain recording numbers which are used by rating and billing systems 138 for many reasons. The major uses are as follows:
- identify the customer to be billed—
- determine the jurisdiction (inter- or intra-state, inter- or intra-LATA) and the appropriate tariff rates—
- determine the distance for rating (for distance-sensitive tariffs) —
- determine the service area (e.g., for MEGACOM ® 800 service)—(MEGACOM is a registered trademark of AT&T).
- correct the time, using the appropriate time zone and daylight savings indicators—
- determine the service band (e.g., for 800 services other than MEGACOM 800)—
- determine the tax jurisdiction, sometimes down to the school district—
- be available for customer use, e.g., providing station identification for bill-back.

Before divestiture, calls were rated based on the location of the calling and called parties. Since divestiture, AT&T has begun offering many nodal services for which the rating systems also need information about the CSN Point of Attachment (POA) with the AT&T CSN. Generally, this information is not easily extracted from the numbers recorded today.

Future recording numbers should satisfy the current needs described above in a more cost effective way. In addition, they should allow flexibility for handling new services and new interfaces. For example, if the CSN 100 interfaces with an OCC 170, CSN 100 may bill the caller based on the origination and destination of a call and share revenues with the OCC 170 based on the CSN POA junction or interface 172 between the two networks. This may also be used for services that require special rating calculations such as ship-to-shore and other wireless services.

Two recording numbers should be available for each end of a call. The first recording number identifies the Network Point of Attachment (NPOA), e.g., 178, 179, 164, 165, 144, 154, 154A, 194 and 195 of FIG. 1, which is the customer location to the extent that the CSN can address/identify it during call set-up. The second recording number identifies the CSN Point of Attachment (CSN POA), e.g., 152, 172, 182 and 192 of FIG. 1. With reference to the recording numbers illustrated in FIG. 3 and in accordance with the present invention, the following four recording numbers are used to identify the two points at each end of a call:

Originating Network Address (Originating NA) 310

This number identifies the Originating Network Point of Attachment (Originating NPOA).

For a call received by CSN 100 from LEC 150, the Originating NA is the Automatic Number Identification (ANI) of the caller (the NANP number assigned by LEC 150), which is passed CSN 100. It is used to determine the rate center and tax jurisdiction of the customer premise or location, e.g., 156. If received on a call from overseas, the Originating NA is an international E.164 number. For a call received by CSN 100 from OCC 170, the Originating NA may be the ANI of the caller.

CSN 100 must assign an Originating NA to each incoming facility group from Direct-Connect and Private Network customers, e.g., NPOA 144, to be used in database queries and when the terminating end requests ANI. This may be the Originating NA of a representative station at the customer location. Note that it may not be the Originating NA of the calling station. The Originating NA may have to indicate the state, LATA, and NPA of the customer premise, depending on the service. It may also be used to determine the V&H coordinates, time zone, daylight savings indicator, and tax jurisdiction of the call origination for some services.

CSN 100 may assign a number internal to the CSN as the Network Address for internal purposes such as identifying a Network Services Complex.

Originating CSN Point of Attachment (Originating CSN POA) Code 320

This code identifies the Originating CSN POA. This is the point where the call accesses the CSN 100, i.e., the point where the CSN 100 facilities begin e.g., CSN POA 152 for calls from LEC 150, CSN POA 172 for calls from OCC 170 and CSN POA 182 for calls from PBX 140, PBX 160, and customer 180. The Originating CSN POA code may be used to determine the V&H coordinates, time zone, daylight savings indicator, and tax jurisdiction of the call origination.

Terminating CSN Point of Attachment (Terminating CSN POA) Code 330

This code identifies the Terminating CSN POA. This is the location where the call egresses from CSN 100 e.g., CSN POA 192. The Terminating CSN POA code provides the same information about the termination of a call as the Originating CSN POA code provides about the origination. The Terminating CSN Switch (TS) will normally have to send the Terminating CSN POA code to the CSN 100 switch (e.g., OS 120 for calls from LEC 150) recording the call. This should be done when the TS determines the facility group to be used by the call for egress from CSN 100.

Destination Network Address (Destination NA) 340

This number identifies the Destination Network Point of Attachment (Destination NPOA), e.g., 194. Note that the Destination NA for a call to a CSN 100 Direct-Connect location may identify the extension (i.e., station), while the Originating NA for a call from that location may only identify the location.

For a call using direct egress, the Destination NA is used to determine the terminating state and LATA. For 800-number services, it must also indicate the terminating NPA, time zone, and use of daylight savings time. Although the example shows calls originating via LEC 150 and OCC 170, if a call were to complete via LEC 150 or an OCC 170, the Destination NA would be used to determine the rate center of the called party. For calls that complete overseas, the Destination NA is used to determine the destination country.

In addition to these numbers, three other recording numbers may be needed:

Dialed Number 350

This number is received when the call enters the CSN 100. In addition, a second dialed number may be provided by the caller after the call reaches the CSN 100, for example a number collected by a Network Services Complex (NSC).

Billed Party Number 360

This number is recorded as a separate number when the call is not to be billed to the origination or destination. It may be an NANP number, an International E.164 number, a calling card number, or possibly a credit card number. This field should allow for numbers that use the American National Standards Institute (ANSI) specifications for credit card numbers.

Station Identification (SID) 370

This number provides additional information about the origination of the call for customer use. It is provided by the customer and passed to the CSN 100 (e.g., by using a data channel). It is not verified by the CSN 100.

The present invention provides for obtaining and recording the numbers and codes shown in the table of FIG. 3 as needed. Not all seven of these recording numbers are needed for every call. The recording numbers that are needed for a specific call will vary, depending on the service, the type of access and egress, and other parameters. Several numbering plans may be used for the Originating NA, Destination NA, Dialed Number, and Billed Party Number. Therefore, a numbering plan type must be associated with each of these recording numbers. This allows the invention to distinguish 1) North American Numbering Plan (NANP), excluding Service Access Codes (SAC) such as 800 for "toll free" service; 2) International E.164; 3) internal Plan; and 4) American National Standards Institute (ANSI)-specified credit card numbers.

Note, although recording numbers are intended primarily to support rating and billing, they may be used for other CSN 100 purposes such as Message Detail Recording (MDR), International Call Detail Records (ICDR), and many systems downstream from rating and billing.

CSN POA codes could be comprised of four parts:
SC—Switch Code or Network Switch Number (NSN), a unique code used to identify each switch of the network,
POP—identifying the POP or Serving Central Office,
TYPE—identifying the type of carrier or that the interface is with a Direct-Connect customer, [a possible implementation would be: 1=Direct Connect, 2=LEC, 3=OCC, 4=International Carrier],
CID—Carrier ID (or 0 for Direct-Connect customers).

CSN POA codes would be assigned administratively to each CSN POA of CSN 100 when this recording number plan is implemented and then when new CSN POAs are installed. If the CSN POA codes are comprised of the four codes above, the codes could be assigned by the method shown in the flow chart in FIG. 4.

With reference to FIG. 4, in step 402, the administrator determines the NSN previously assigned (e.g., as described in our previously referenced patent application) to the switch to which the CSN POA in question is attached. For example, the SC for CSN POAs 152, 172, and 182 is the NSN already assigned to OS 120.

In step 404, the administrator determines the type of access (type of trunk connection).

If the trunk originated from a Direct-Connect customer (e.g., station 180 or PBX 140), then in step 406, the POP code is set to the code of the CSN Serving Central Office as defined in Tariff 10. The TYPE is then set to Direct Connect (e.g., a value of 1) in step 408. The CID is set to 0 in step 410.

If the trunk is a switched access trunk from an LEC (e.g., trunk 153 from LEC 150), in step 412 the POP is set to the code of the LEC POP. In this implementation, the POP is relative to the switch to which the trunk is attached, e.g., the CSN POAs with trunks to OS 120 might be numbered from 1 to n. Then in step 414 the TYPE is set to LEC (e.g., a value of 2). In step 416 the CID is set to the LEC identification code for LEC 150.

If the trunk is a connection from an inter-exchange carrier (e.g., OCC 170) or an international carrier, in step 420, the POP is set to the code of the point of interconnection or facility junction with this other carrier again relative to the switch. For an international carrier, the TYPE is set to international (e.g., a value of 4) in step 424 and CID is set to the International Carrier Identification Code in step 426. For an OCC, the TYPE is set to OCC (e.g., a value of 3) in step 428 and the CID is set to the Carrier Identification Code in step 430.

After CSN POA codes are assigned, they are used in trunk subgroup (TSG) information in the switch and by rating systems. A switch has information in its data store about each TSG connected to it. This TSG information must include the CSN POA code of the CSN POA that the TSG goes through. The CSN POA code along with the associated rating and billing parameters must be sent to the rating systems. After this is set up, individual calls can be handled as described below.

Figure 5:
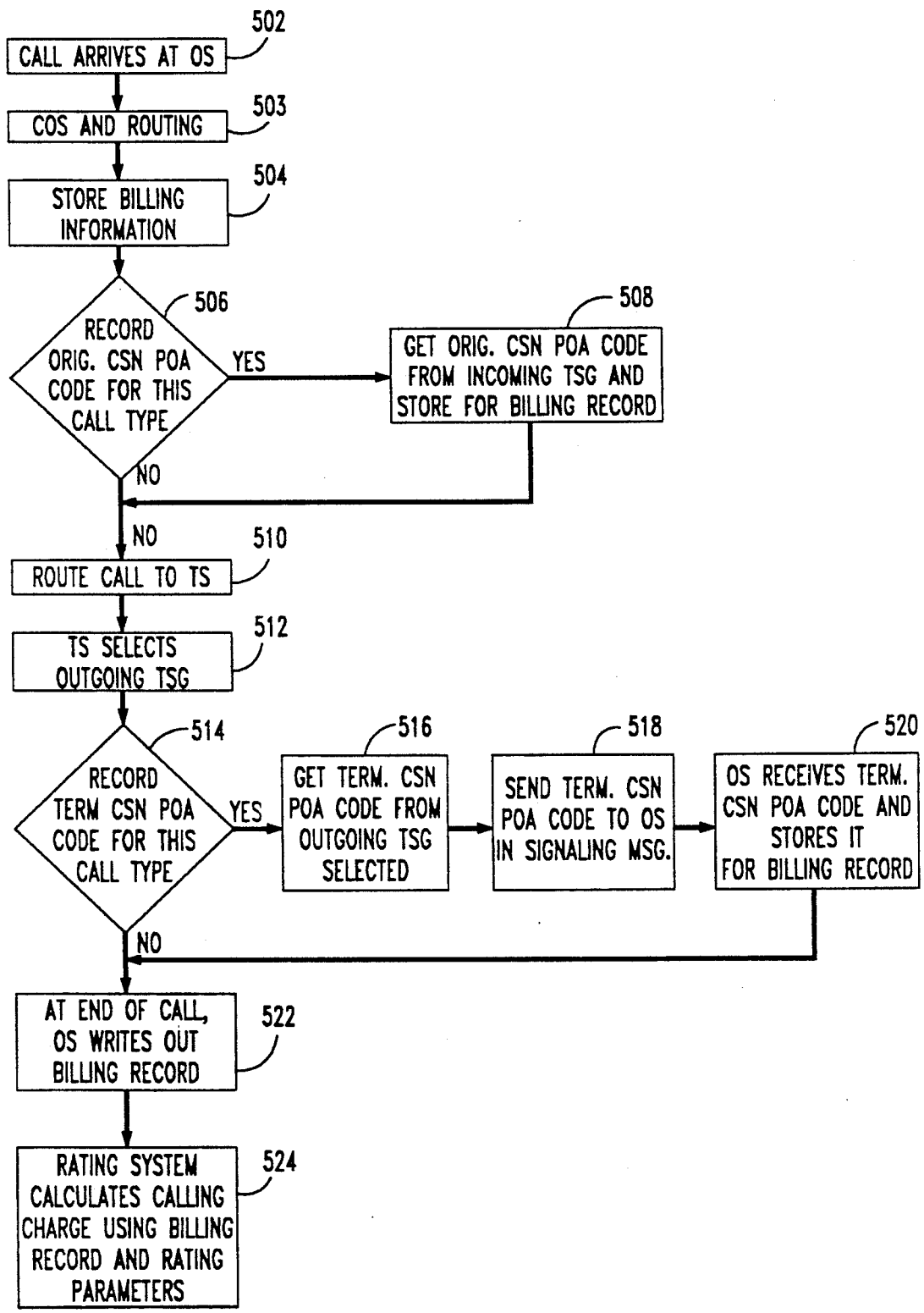
FIG. 5 shows a flow diagram describing the operation of the recording plan in accordance with the present invention.

Shown in FIG. 5 is a flow chart describing the recording plan method in accordance with the present invention. Assume a caller at location 156 dials the number of the station at location 196A. In step 502, the call is handled by LO 155 and arrives at OS 120 via LEC 150 and via CSN POA 152. In addition to the Dialed Number 350, signaling information is received at OS 120 from LO 155 including Originating Network Address 310 the (NA of NPOA 154 in our example). If the call was to be billed to a card number, then the Billed Card Number 360 would be received at OS 120. OS 120 might also receive any Station Identification number 370 (more commonly from a PBX directly connected to the CSN).

In step 503, the OS 120 determines the type of call and routing information, possibly using the Class of Service (COS) and Destination Network Address as described in our previously identified pending patent application. In our example, the OS 120 will generate an AMA record for this call. Therefore, in step 504, OS 120 stores, in memory 127, billing information to be recorded. The billing information needed for this particular call will depend on the type of call. For example, for a AT&T MEGACOM 800 Service call, the originating Network Address, destination Network Address and Dialed Number would be stored at this time.

In step 506, OS 120 determines if the Orginating CSN POA code should be recorded for this type of call. For AT&T MEGACOM 800 Service calls, it is not needed, but it would be recorded for calls orginating on a direct-connect trunk (e.g. MEGACOM, Software Defined Network, nodal Switched Digital Service). If the Originating CSN POA code is needed, in step 508, it would be obtained from data in memory 127 associated with the incoming trunk subgroup (TSG). In our example, it would be the code assigned to CSN POA 152.

In step 510, the call is routed in a well-known manner (or using our previous patent application) to TS 122 possibly via VS 121. In step 512, TS 122 selects an outgoing trunk subgroup (TSG), 193 in our example.

In step 514, the TS 122 determines if the Terminating CSN POA code should be recorded for this type of call. For services such as MEGACOM 800 and SDN, it should be recorded. It is not currently needed for MEGACOM or POTS. If the Terminating CSN POA code is to be recorded, TS 122 obtains it from data in its memory associated with the outgoing TSG in step 516. In our example, it would be the code assigned to CSN POA 192 where TSG 193 leaves the CSN. In step 518, TS 122 sends a signaling message to OS 120 containing the code of CSN POA 192 using a well-known interoffice signaling protocol such as CCS7. OS 120 receives the signaling message containing the CSN POA code in step 520 and stores it in its memory 127.

When the call is disconnected, in step 522, OS 120 takes the billing information it has stored in memory and generates an AMA record containing the appropriate fields. This record is written to stored media 137.

The AMA record is collected and sent to rating and billing systems 138 in a well-known manner. In step 524, the rating system 138 calculates the calling charges using the CSN POA code and rating parameters. When the rating system 138 needs information about a CSN POA, it uses the CSN POA code recorded in the AMA record and the appropriate entry in Table C of FIG. 2 described below.

For each nodal service, prior art rating systems 138 typically maintain, as part of the customer account information, a large, cumbersome table (Table B in FIG. 2) that provides for each 10-digit number of a direct-connect customer the following: the Vertical and Horizontal (V&H) coordinates, NPA, time zone, daylight savings indicator (DSI), and tax jurisdiction of the serving central office. This is in addition to Table A in FIG. 2, which includes for every NPA-NXX (Area Code-Central Office Number) the following: state, LATA, and other information. Table A is used to obtain information about the customer premises. Table B is used to obtain information about the CSN POA (for direct-connect customers—the serving central office). Table B must be updated for every new customer, whenever a TSG from a direct-connect customer is added to the CSN or moved to a different CSN POA.

The rating process (calculating the calling charges for a call) for nodal services is simplified in accordance with the present invention, by including the identity of the orginating and/or terminating serving central office (CSN POA code) in AMA records for nodal services as appropriate to the service. When this is done, Table C can replace Table B. Table C provides for each CSN POA code the following call rating parameters: the Vertical and Horizontal (V&H) coordinates, NPA, time zone, daylight savings indicator (DSI), and tax jurisdiction of the serving central office (CSN POA). Table C is much smaller and much less volatile than Table B, and therefore much easier to administer. Table C will change only when a new CSN POA is added to the CSN. Table C does not need to be updated when network access and/or egress facilities are re-homed (repositioned).

In addition to nodal services, this invention can also support other types of services. Table C may include, for example, CSN POA codes for interconnections with LECs, OCCs, wireless carriers and international carriers. Then rating and settlements with these carriers could likewise also be based on the CSN POAs. It should be understood that CSN POA codes may include one or more numbers, letters and characters or combinations thereof. As previously noted, the present invention may generally be utilized to record and rate any transaction which can be handled by the described communication network. While the present invention has been described as using an AMA format for a billing record, it will apply, more generally, to any type of billing record.

What has been described is merely illustrative of the application of the principles of the present invention. Other arrangements and methods can be implemented by those skilled in the art without departing from the spirit and scope of the present invention.

We claim:

1. A method of deriving charges for a communications transaction completed over a communications network, comprising the steps of:
    storing rating parameters and a unique code for each of a plurality of Carrier Switched Network Point of Attachment (CSN POA) locations of said network,
    recording a code of at least one CSN POA location participating in the transaction, and
    calculating a charge for said transaction using rating parameters associated with at least one recorded code of said transaction.

2. The method of claim 1 wherein:
    said recording step records the identification of at least one network address selected from a group including an originating network address (ONA) and a destination network address (DNA), and
    said calculating step uses rating parameters associated with said at least one network address.

3. The method of claim 2 wherein at least one network address is recorded in a message detail recording (MDR) record associated with said transaction, in addition to one or more CSN POA codes.

4. The method of claim 2 wherein at least one network address is recorded in an International Call Detail Record (ICDR) associated with said transaction, in addition to one or more CSN POA codes.

5. The method of claim 2 wherein a numbering plan type is associated with each network address and recorded with it.

6. The method of claim 1 wherein:
    said calculating step calculates the transaction charges utilizing one or more of the following data selected from a group including the dialed number, billed party number and station ID associated with said transaction.

7. The method of claim 6 wherein a numbering plan type is associated and recorded with either the dialed number or the billed party number.

8. The method of claim 1 wherein one or more of said CSN POA codes are recorded in a message detail recording (MDR) record associated with said transaction.

9. The method of claim 1 wherein one or more of said CSN POA codes are recorded in an International Call Detail Record (ICDR) associated with said transaction.

10. The method of claim 1 wherein a numbering plan type is associated with each CSN POA code and recorded with it.

11. The method of claim 1 wherein the stored rating parameters may include one or more parameters selected from a group including state, LATA, V&H coordinates, NPA, time zone, daylight savings indicator, and tax jurisdiction.

12. The method of claim 1 wherein the CSN POA code includes one or more codes selected from a group including a switch code, POP or Serving Central Office code, type of carrier or direct-connect customer code, and carrier identification code.

13. A method of operating a communication switching office for establishing and completing transactions made over facilities connected to said office, the method comprising the steps of:
    assigning a code to identify a Carrier Switched Network Point of Attachment (CSN POA) location where one or more facilities connected to said office interface with a CSN, and
    in response to a transaction completed over a facility connected to said CSN POA location, generating a billing record which includes said CSN POA code.

14. The method of claim 13 wherein the transaction is originated at said office.

15. The method of claim 13 wherein the transaction is terminated at said office.

16. The method of claim 15 wherein said office sends the CSN POA code to an originating switch of the transaction, to be included in the billing record generated by the originating switch.

17. The method of claim 13 wherein one or more of said CSN POA codes are recorded in a Message Detail Recording (MDR) record associated with the transaction.

18. The method of claim 13 wherein one or more of said CSN POA codes are recorded in an International Call Detail Record (ICDR) associated with the transaction.

19. The method of claim 13 wherein the CSN POA code includes one or more codes selected from a group including a switch code, POP or Serving Central Office code, type of carrier or direct-connect customer code, and carrier identification code.

20. The method of claim 13 further including the step of
    sending a billing record to an associated rating system accessible from said office, said billing record including said CSN POA code.

21. A method of operating a rating system for rating transactions placed over a communication network, the method comprising the steps of
    storing transaction rating parameters associated with each of a plurality of CSN POA codes, each code assigned to an access location (CSN POA) of said communication network, receiving a transaction billing record including one or more CSN POA codes for a transaction completed over said communication network, and determining charges for each transaction using stored rating parameters associated with said CSN POA codes received in said transaction billing record.

22. A method of operating a communication network including one or more switching offices and an associated rating system, said rating system arranged to rate transactions completed over the network, said method comprising the steps of:

assigning codes to each of one or more access locations (CSN POAs) of the network, storing rating parameters associated with each CSN POA location, when a transaction is completed across the network, generating a billing record which includes the CSN POA code for one or more of the CSN POA locations used in said transaction, and calculating the charge for said transaction using the rating parameters associated with each CSN POA code recorded in said billing record.

23. The method of claim 22 wherein a re-positioning of a facility to a different CSN POA location does not result in a corresponding change to data in the rating system.

24. A communication network comprising:

one or more interconnected switches, trunk means for interfacing said switches with another network or customer, and a code for identifying a location (CSN POA) where each of said trunk means interfaces said network to said another network or customer.

25. The network of claim 24 wherein said code includes one or more codes selected from a group including a switch code, POP or Serving Central Office code, type of carrier or direct-connect customer code, and carrier identification code.

26. The network of claim 24 including means for recording in a billing record one or more codes identifying CSN POA locations used for a transaction and means for calculating a transaction charge for a transaction placed over said network using rating parameters associated with said recorded one or more CSN POA codes.

27. An originating switch for use in a communications network, comprising:

means for receiving a transaction over a trunk connected to said switch, a code for identifying the location (CSN POA) where said trunk enters said network, and means for recording said code in a billing record for said transaction passing through said switch over said trunk.

28. The originating switch of claim 27 further comprising means for receiving a terminating CSN POA code and means for recording said terminating CSN POA code.

29. A terminating switch for use in a communcation network, comprising means for completing a transaction over a trunk connected to said switch, a code for identifying the location (CSN POA) where said trunk leaves said network, and means for recording said code in a billing record for said transaction passing through said switch over said trunk.

30. The switch of claim 29 further comprising sending said code to an originating switch to generate a billing record for a transaction passing through said switch over said trunk.

31. Apparatus for deriving transaction charges for a communications transaction completed over a communications network comprising means for storing rating parameters and a unique code for each of one or more Carrier Switched Network Point of Attachment (CSN POA) locations of said network, means for recording the code of at least one CSN POA location of a transaction, and means for calculating a transaction charge for said transaction using rating parameters associated with each recorded CSN POA code of said transaction.

32. A rating system for rating transactions completed over a communication network comprising means for storing transaction rating parameters associated with each of a plurality of CSN POA codes, each code assigned to a CSN POA access location of said communication network, means for receiving a transaction billing record including one or more CSN POA codes for a transaction completed over said communication network, and means for determining transaction charges for said transaction using stored transaction rating parameters associated with said CSN POA codes received in said transaction billing record.

* * * * *